May 9, 1961

N. A. PIERSON 2,983,404

CONE ROOF TANKS PROVIDED WITH VAPOR BALANCED
TYPE CONSERVATION UNITS

Filed April 30, 1958

INVENTOR.
Norman A. Pierson

BY

Smith, Prangley, Baird & Clayton,

Attys.

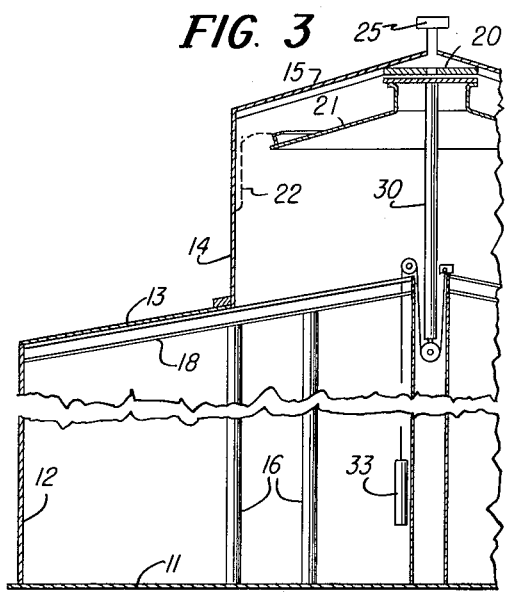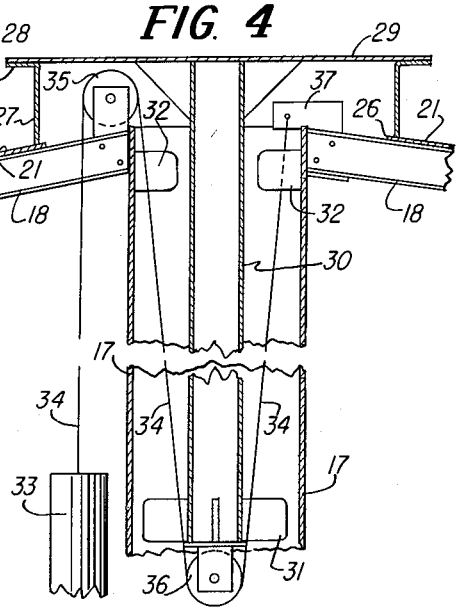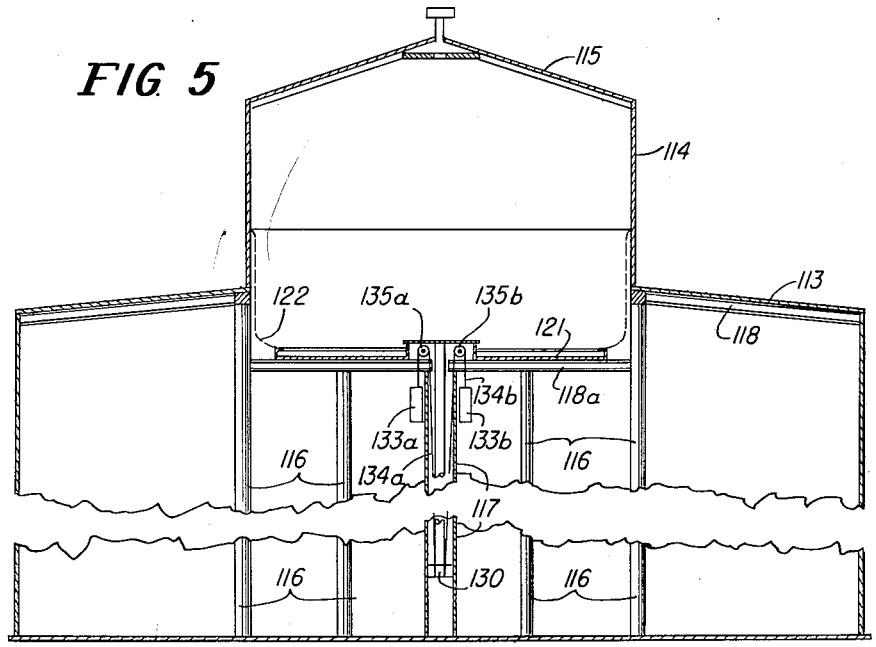

United States Patent Office 2,983,404
Patented May 9, 1961

2,983,404

CONE ROOF TANKS PROVIDED WITH VAPOR BALANCED TYPE CONSERVATION UNITS

Norman A. Pierson, Arcadia, Calif., assignor to General American Transportation Corporation, Chicago, Ill., a corporation of New York Filed Apr. 30, 1958, Ser. No. 732,039

6 Claims. (Cl. 220—85)

The present invention relates to cone roof tanks provided with vapor balanced type conservation units that are particularly adapted for the storage of volatile liquids, such, for example, as gasoline and other light hydrocarbon products.

It is a general object of the invention to provide in a cone roof tank incorporating a vapor balanced type conservation unit, an improved arrangement for guiding the piston of the unit as it is selectively moved in the vertical direction therein to vary the effective volume of the tank so as to maintain substantially constant the gas or vapor pressure in the tank.

Another object of the invention is to provide in a tank for storing volatile liquids and incorporating a vapor balanced type conservation unit, an improved system for counterbalancing the piston that is included in the conservation unit as it is selectively moved in the vertical direction to vary the effective volume of the tank, wherein the counterbalancing system is disposed entirely internally of the tank.

A further object of the invention is to provide in a tank incorporating a gas holder, an improved arrangement for guiding and for counterbalancing the piston that is incorporated in the gas holder as it is selectively moved in the vertical direction to vary the effective volume of the tank.

Further features of the invention pertain to the particular arrangement of the elements of the tank and gas holder, whereby the above-outlined and additional operating features thereof are attained.

The invention, both as to its organization and method of operation, together with further objects and advantages thereof, will best be understood by reference to the following specification, taken in connection with the accompanying drawings, in which:

Fig. 3 is another fragmentary vertical sectional view of the tank unit, similar to Fig. 2, illustrating the piston of the conservation unit in its fully extended or upper position;

Fig. 4 is a greatly enlarged vertical sectional view of the central portion of the piston and the associated guiding and counterbalancing mechanism, as illustrated in Figs. 2 and 3; and Fig. 5 is a fragmentary vertical sectional view of a modified form of the tank and conservation unit.

Figure 1:
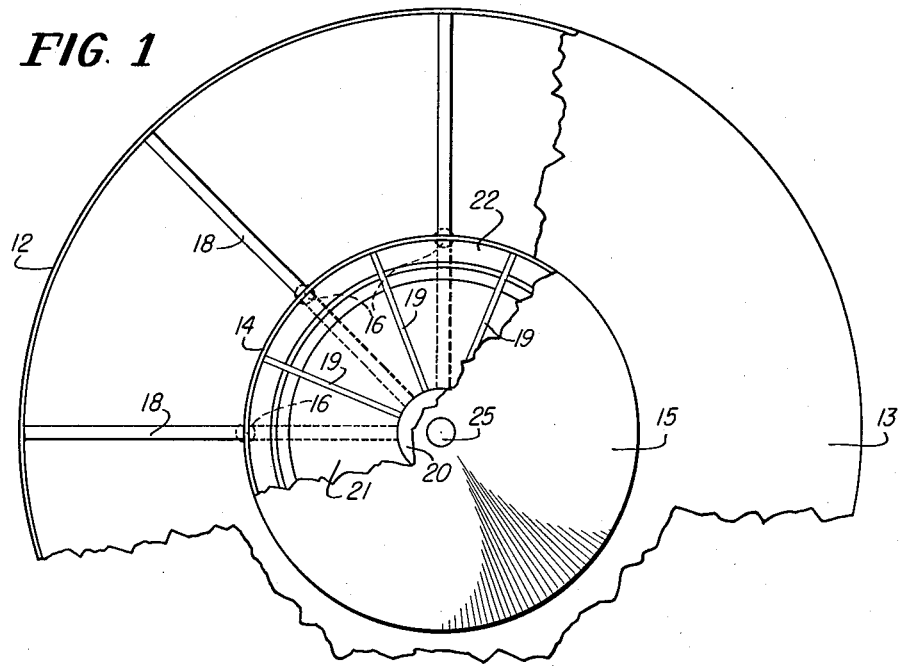
Figure 1 is a fragmentary plan view, partly broken away, of a cone roof tank incorporating a vapor balanced type conservation unit embodying the present invention.
Figure 2:
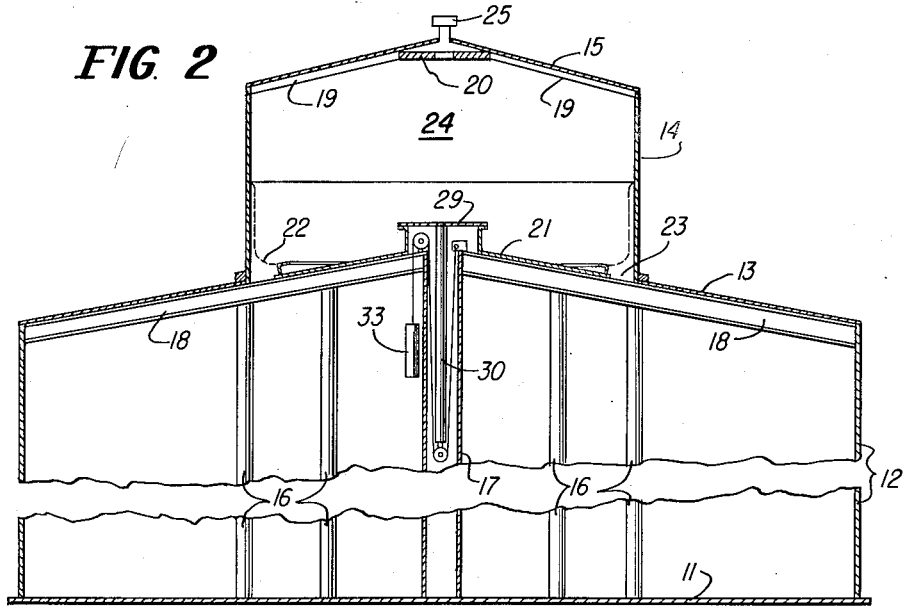
Fig. 2 is a fragmentary vertical sectional view of the tank and unit shown in Fig. 1, illustrating the piston of the conservation unit in its fully retracted or lower position.

Referring now to Figs. 1 to 3, inclusive, of the drawings, the tank and vapor balanced type conservation unit there illustrated and embodying the features of the present invention, essentially comprises a unitary structure including a substantially circular bottom wall 11, a first upstanding substantially cylindrical side wall 12 sealed at the bottom thereof to the outer periphery of the bottom wall 11, a first substantially annular roof 13 sealed at the outer periphery thereof to the top of the first side wall 12, a second upstanding substantially cylindrical side wall 14 sealed at the bottom thereof to the inner periphery of the first roof 13, and a second substantially conical roof 15 sealed at the outer periphery thereof to the top of the second side wall 14. A substantially annular array of upstanding columns 16 are carried by the bottom wall 11 and positioned below the junction between the first roof 13 and the second side wall 14; and in the arrangement, eight such columns 16 may be provided. An upstanding tube 17 is carried by the central portion of the bottom wall 11 and terminating slightly above the level of the junction between the first roof 13 and the second side wall 14. Also a radial array of eight rafters 18 extend between the tops of the columns 16 and the top of the tube 17 and extend radially outwardly to the top of the first side wall 12; which rafters 18 are disposed below and in supporting position with respect to the first roof 13. More particularly, as illustrated, each of the rafters 18 is pitched upwardly at a low angle from the top of the first side wall 12 to the top of one of the columns 16 and then to the top of the tube 17. Also a radial array of rafters 19 are disposed below the second roof 15 in supporting relation therewith; and in the arrangement eight such rafters 19 may be provided. The inner ends of the rafters 19 terminate upon a centrally disposed ring 20 and the outer ends of the rafters 19 terminate at the top of the second side wall 14. Each of the rafters 19 is pitched upwardly from the top of the second side wall 14 to the central ring 20 at a low angle.

In the arangement, the tank proper is defined within the first side wall 12 between the bottom wall 11 and the first roof 13, while the conservation unit is defined within the second side wall 14 and below the second roof 15; whereby the conservation unit is disposed above the tank and in concentric alignment with the center line thereof. Moreover, the elements of the tank and the conservation unit described are normally formed of steel and suitably welded together to form a unitary structure.

Arranged above the inner radially projecting ends of the rafters 18 is a piston 21 that is substantially conical in form and disposed in concentric alignment with the center line of the tube 17; which piston 21 is connected at the outer periphery thereof to an intermediate annular portion of the second side wall 14 by a flexible curtain or seal 22 that may be formed of a suitable gas-impervious fabric. Accordingly, the piston 21 is sealed by the curtain 22 to the central portion of the second side wall 14 and is movable in the vertical direction from its fully retracted or lower position, as illustrated in Fig. 2, into its fully extended or upper position, as illustrated in Fig. 3, thereby to vary the effective volume of the tank so as to maintain substantially constant the vapor pressure over a voltatile liquid, such as gasoline, stored in the tank. Thus the piston 21 and the cooperating curtain 22 divide the volume of the conservation unit defined within the second side wall 14 into a lower space 23 communicating directly with the top of the tank through the spaces between the inner ends of the rafters 18 and an upper space 24 defined immediately below the second roof 15. Furthermore, a suitable valve mechanism, indicated at 25, is carried at the top of the second roof 15 so as to control the breathing of air into and out of the upper space 24 as the piston 21 is moved respectively downwardly and upwardly.

Referring now more particularly to Fig. 4, the piston 21 is provided with a substantially circular centrally disposed opening 26 therein and includes an upwardly extending substantially annular collar 27 sealed thereto about the opening 26. The upper end of the annular collar 27 terminates in an outwardly directed annular flange 28 and removably carries a substantially circular manway 29. The manway 29 is normally carried by and sealed to the flange 28, but is removable for a purpose more fully explained below. A substantially centrally disposed guide stem 30 is rigidly secured to the manway 29 and depends therefrom, projecting into the upper open end of the guide tube 17. The lower end of the guide stem 30 carries structure 31 that cooperates with the interior surface of the guide tube 17; and likewise, the interior upper surface of the guide tube 17 carries structure 32 that cooperates with the exterior surface of the guide stem 30. The structure 31, as illustrated, comprises a series of radially outwardly extending fins; and similarly, the structure 32, as illustrated, comprises a series of radially inwardly extending fins; whereby the movement of the guide stem 30 with respect to the guide tube 17 is guided and controlled so as to prevent tipping of the piston 21 in its vertical travel. When the piston 21 occupies its fully retracted position of Fig. 2, it is directly supported upon the inner ends of the rafters 18, thereby limiting the downward movement thereof in its travel; and when the piston 21 occupies its fully extended position of Fig. 3, the manway 29 directly engages the ring 20, thereby limiting the upward movement thereof in its travel. In the arrangement, sufficient slack is provided in the curtain 22 to accommodate the travel of the piston 21 between its lower and upper limits without damage to the curtain 22 or impairing the seal between the piston 21 and the second side wall 14.

For the purpose of counterbalancing the piston 21 in its vertical travel, a system is provided that is arranged entirely within the tank and below the piston 21; which system comprises a weight 33 secured to one end of a flexible cable 34, a pulley 35 secured to the top of the guide tube 17, a pulley 36 secured to the bottom of the guide stem 30, and an anchor 37 also secured to the top of the guide tube 17. In the arrangement, the pulley 35 and the anchor 37 are disposed in substantially diammetrically opposite positions with respect to each other at the top of the guide tube 17; and the other end of the cable 34 is secured to the anchor 37, the intermediate portion of the cable 34 extending into cooperating relation with both of the pulleys 35 and 36. More particularly, the cable 34 extends upwardly from the weight 33 over the pulley 35 and downwardly into the guide tube 17 and thence over the pulley 36 and upwardly through the guide tube 17 to the anchor 37.

In the operation of the piston 21, it will be understood that when the pressure of the vapor over the volatile liquid stored in the tank is increased, the piston 21 is lifted from its position of Fig. 2 upwardly toward its position of Fig. 3; whereby the weight 33 moves downwardly assisting the piston 21 in its upward movement, so that the effective volume of the tank is increased for the purpose of reducing the vapor pressure therein and in order to obtain a balance so as to maintain the desired vapor pressure in the tank. On the other hand, when the pressure of the vapor over the volatile liquid stored in the tank is decreased, the piston 21 is depressed from its position of Fig. 3 downwardly toward its position of Fig. 2; whereby the weight 33 moves upwardly opposing the piston 21 in its downward movement, so that the effective volume of the tank is decreased for the purpose of increasing the vapor pressure therein and in order to obtain a balance so as to maintain the desired vapor pressure in the tank. For example, when gasoline is stored in the tank, there is considerable variation in the vapor pressure dependent upon the temperature, whereby the gasoline alternately vaporizes and condenses as the temperature rises and falls during the course of a day. However, the action of the piston 21 in its movement in the conservation unit preserves a substantially constant and predetermined vapor pressure in the tank, notwithstanding the variation of the volatility of the gasoline stored in the tank.

As previously noted, the valve mechanism 25 accommodates the required breathing between the upper space 24 and the atmosphere as the piston 21 is moved in the vertical direction; and of course, it is apparent that the valve mechanism 25 may be selectively set so as to maintain a desired pressure within the upper space 24. Specifically, the valve 25 may be set so as to maintain a pressure somewhat in excess of atmospheric pressure in the space 24; on the other hand, the valve 25 may be set so as to maintain a pressure somewhat less than atmospheric pressure in the space 24.

Referring now to Fig. 5, a modified form of the tank and the vapor balanced type conservation unit is illustrated that is of unitary structure and substantially identical to that previously described, except that in this construction, the rafters 118 that support the first roof 113 terminate at the inner ends thereof upon the tops of the associated columns 116, and a second annular array of rafters 118a is provided that extend between the top of the guide tube 117 and the corresponding upper portions of the columns 116; whereby the rafters 118a are disposed below the rafters 118 so as to increase the travel of the piston 121 in the second side wall 114. In this arrangement, the piston 12 is of substantially flat disk-like construction, rather than of the substantially conical construction previously described, and the outer periphery thereof is connected to the intermediate portion of the second side wall 114 by the substantially annular curtain 122, the curtain 122 being somewhat longer in this construction than the corresponding curtain 22 of the unit, as shown in Figs. 2 and 3. Also, in this modified form of the tank and unit, as shown in Fig. 5, the counterbalancing system is varied and comprises two weights 133a and 133b that are respectively connected to two flexible cables 134a and 134b that respectively extend over two corresponding pulleys 135a and 135b that are carried at the upper end of the guide tube 117 and that are commonly connected to the lower end of the guide stem 130.

The mode of operation of this modified form of the tank and the unit is essentially the same as that previously described and is not repeated in the interest of brevity.

In view of the foregoing, it is apparent that there has been provided in a tank for storing volatile liquids and incorporating a vapor balancing type conservation unit, an improved and exceedingly simple mechanism for guiding the vertical movements of the piston of the unit, as well as an improved counterbalancing system for controlling the movements of the piston in response to variation in the vapor pressure above the volatile liquid stored in the tank.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. A tank for the storage of liquids subject to variable vapor pressure comprising a substantially circular bottom wall, a first upstanding substantially cylindrical side wall sealed at the bottom thereof to the outer periphery of said bottom wall, a first substantially annular roof sealed at the outer periphery thereof to the top of said first side wall, a second upstanding substantially cylindrical side wall sealed at the bottom thereof to the inner periphery of said first roof, a second substantially conical roof sealed at the outer periphery thereof to the top of said second side wall, a substantially circular piston arranged in the upper portion of said tank and movable in the vertical direction in said second side wall toward and away from said bottom wall, a sealing element arranged between the periphery of said piston and said second side wall to prevent the escape of fluid therebetween and accommodating the vertical movements of said piston, whereby said piston is movable in the vertical direction to vary the volume of said tank in accordance with the pressure of the fluid stored therein, an upstanding guide tube carried by the central portion of said bottom wall and having an open upper end and disposed below said piston, a guide stem rigidly secured to said piston and movable therewith, said guide stem depending from said piston and projecting into the open upper end of said guide tube and cooperating therewith to guide the vertical movements of said piston, first means for limiting the downward travel of said piston, second means for limiting the upward travel of said piston, and means including a counterweight system for varying the effect of the pressure of the fluid in said tank upon said piston so as to control the vertical movements thereof, said counterweight system being disposed entirely within said tank and including elements acting between said guide tube and said guide stem.

2. The storage tank set forth in claim 1, wherein said counterweight system includes a first guide pulley carried by the upper end of said guide tube, a second guide pulley carried by the lower end of said guide stem, a flexible cable cooperating with said first and second guide pulleys, and a weight disposed in said tank and secured to said cable and movable in the vertical direction in the fluid stored in said tank along a path disposed adjacent to and exteriorly of said guide tube.

3. The storage tank set forth in claim 1, and further comprising means carried by said second roof for controlling breathing between the atmosphere and the space disposed above said piston in the upper portion of said tank as said piston is moved in the vertical direction.

4. A tank for the storage of liquids subject to variable vapor pressure comprising a substantially circular bottom wall, a first upstanding substantially cylindrical side wall sealed at the bottom thereof to the outer periphery of said bottom wall, a first substantially annular roof sealed at the outer periphery thereof to the top of said first side wall, a second upstanding substantially cylindrical side wall sealed at the bottom thereof to the inner periphery of said first roof, a second substantially conical roof sealed at the outer periphery thereof to the top of said second side wall, a substantially circular piston arranged in the upper portion of said tank and movable in the vertical direction in said second side wall toward and away from said bottom wall, a sealing element arranged between the periphery of said piston and said second side wall to prevent the escape of fluid therebetween and accommodating the vertical movements of said piston, whereby said piston is movable in the vertical direction to vary the volume of said tank in accordance with the pressure of the fluid stored therein, an upstanding guide tube carried by the central portion of said bottom wall and having an open upper end and disposed below said piston, a guide stem rigidly secured to said piston and movable therewith, said guide stem depending from said piston and projecting into the open upper end of said guide tube and cooperating therewith to guide the vertical movements of said piston, a substantially annular array of upstanding columns carried by said bottom wall and positioned below the junction of said first roof and said second side wall, a radial array of rafters extending between the upper portions of said columns and the top of said guide tube and disposed below said piston, said rafters supporting said piston in its lowermost position, thereby to limit the downward travel thereof, means for limiting the upward travel of said piston, and means including a counterweight system for varying the effect of the pressure of the fluid in said tank upon said piston so as to control the vertical movements thereof, said counterweight system being disposed entirely within said tank and including elements acting between said guide tube and said guide stem.

5. The storage tank set forth in claim 4, wherein said rafters also extend radially outwardly from said columns below said first roof and in supporting relation therewith.

6. A tank for the storage of liquids subject to variable vapor pressure comprising a substantially circular bottom wall, a first upstanding substantially cylindrical side wall sealed at the bottom thereof to the outer periphery of said bottom wall, a first substantially annular roof sealed at the outer periphery thereof to the top of said first side wall, a second upstanding substantially cylindrical side wall sealed at the bottom thereof to the inner periphery of said first roof, a second substantially conical roof sealed at the outer periphery thereof to the top of said second side wall, a substantially circular piston arranged in the upper portion of said tank and movable in the vertical direction in said second side wall toward and away from said bottom wall, a sealing element arranged between the periphery of said piston and said second side wall to prevent the escape of fluid therebetween and accommodating the vertical movements of said piston, whereby said piston is movable in the vertical direction to vary the volume of said tank in accordance with the pressure of the fluid stored therein, an upstanding guide tube carried by the central portion of said bottom wall and having an open upper end and disposed below said piston, a guide stem rigidly secured to said piston and movable therewith, said guide stem depending from said piston and projecting into the open upper end of said guide tube and cooperating therewith to guide the vertical movements of said piston, a substantially annular array of upstanding columns carried by said bottom wall and positioned below the junction of said first roof and said second side wall, an upper radial array of first rafters extending between the tops of said columns and the top of said first side wall and below said first roof and disposed in supporting relation therewith, a lower radial array of second rafters extending between the upper portions of said columns and the top of said guide tube and disposed below said piston, said second rafters supporting said piston in its lowermost position, thereby to limit the downward travel thereof, means for limiting the upward travel of said piston, and means including a counterweight system for varying the effect of the pressure of the fluid in said tank upon said piston so as to control the vertical movements thereof, said counterweight system being disposed entirely within said tank and including elements acting between said guide tube and said guide stem.

References Cited in the file of this patent

UNITED STATES PATENTS

| | | |
|---|---|---|
| 283,137 | Nevius | Aug. 14, 1883 |
| 2,337,010 | Wiggins | Dec. 14, 1943 |
| 2,624,490 | Fino et al. | Jan. 6, 1953 |
| 2,778,720 | St. Clair et al. | Jan. 22, 1957 |

FOREIGN PATENTS

| | | |
|---|---|---|
| 591,716 | Great Britain | Aug. 27, 1947 |